United States Patent
Shastri et al.

(10) Patent No.: US 9,971,096 B2
(45) Date of Patent: May 15, 2018

(54) PASSIVE FIBER OPTIC BUTT COUPLING USING A SEMICONDUCTOR ETCHED FEATURE

(71) Applicant: Cisco Technology, Inc., San Jose, CA (US)

(72) Inventors: Kal Shastri, Orefield, PA (US); Rao Yelamarty, Allentown, PA (US); Neeraj Dubey, Northhampton, PA (US); David Piede, Allentown, PA (US); Weizhuo Li, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/169,836

(22) Filed: Jun. 1, 2016

(65) Prior Publication Data

US 2017/0351031 A1    Dec. 7, 2017

(51) Int. Cl.
*G02B 6/30* (2006.01)
*G02B 6/36* (2006.01)
*G02B 6/136* (2006.01)
*G02B 6/12* (2006.01)

(52) U.S. Cl.
CPC ............... *G02B 6/30* (2013.01); *G02B 6/136* (2013.01); *G02B 6/3652* (2013.01); *G02B 6/3692* (2013.01); *G02B 2006/121* (2013.01); *G02B 2006/12097* (2013.01)

(58) Field of Classification Search
CPC ........... G02B 6/30; G02B 6/3692; G02B 6/36
USPC ......................................................... 385/14
See application file for complete search history.

(56) References Cited

U.S. PATENT DOCUMENTS

| | | | | |
|---|---|---|---|---|
| 5,555,333 A | * | 9/1996 | Kato | G02B 6/4214 385/83 |
| 5,671,315 A | * | 9/1997 | Tabuchi | G02B 6/4208 385/137 |
| 5,790,730 A | * | 8/1998 | Kravitz | G02B 6/30 385/14 |
| 6,152,610 A | * | 11/2000 | Hattori | G02B 6/2551 385/14 |
| 6,626,585 B1 | * | 9/2003 | Malone | G02B 6/423 385/88 |

(Continued)

OTHER PUBLICATIONS

U.S. Appl. No. 14/930,857 to Kalpendu Shastri et al., filed Nov. 3, 2015.

*Primary Examiner* — Kaveh C Kianni
(74) *Attorney, Agent, or Firm* — Patterson + Sheridan, LLP (57) ABSTRACT

Embodiments herein include an optical system that passively aligns a fiber array connector (FAC) to a waveguide in a photonic chip. A substrate of the FAC is machined or etched to include multiple grooves along a common axis or plane to hold optical waveguides, or more specifically, the fibers of the optical cables in the FAC. To align the fibers to the photonic chip, one of the fibers is disposed in an alignment trench which has a width that is substantially the same as the diameter of the fiber. When the fiber registers with the alignment trench, the fiber is aligned with a waveguide disposed at the end of the trench. Because the pitch between the fibers can be precisely controlled, aligning one of the fibers using the alignment trench results in the other fibers becoming passively aligned to respective waveguides in the photonic chip.

7 Claims, 8 Drawing Sheets

(56) References Cited

U.S. PATENT DOCUMENTS

| | | | | |
|---|---|---|---|---|
| 6,895,161 | B2* | 5/2005 | Romo | G02B 6/266 |
| | | | | 385/140 |
| 7,066,657 | B2* | 6/2006 | Murali | G02B 6/4214 |
| | | | | 385/49 |
| 7,418,175 | B2* | 8/2008 | Aizpuru | G02B 6/423 |
| | | | | 385/14 |
| 8,803,269 | B2* | 8/2014 | Shastri | G02B 6/426 |
| | | | | 257/432 |
| 9,335,493 | B2* | 5/2016 | Isenhour | G02B 6/4206 |
| 2002/0114590 | A1* | 8/2002 | Eichenberger | G02B 6/3807 |
| | | | | 385/89 |
| 2003/0118294 | A1* | 6/2003 | Korenaga | G02B 6/12007 |
| | | | | 385/92 |
| 2004/0114859 | A1* | 6/2004 | Colgan | G02B 6/3636 |
| | | | | 385/31 |
| 2004/0120682 | A1* | 6/2004 | Bhagavatula | G02B 6/3636 |
| | | | | 385/137 |
| 2005/0063634 | A1* | 3/2005 | Cohen | B29D 11/0075 |
| | | | | 385/14 |
| 2012/0301073 | A1* | 11/2012 | DeMeritt | G02B 6/4204 |
| | | | | 385/14 |
| 2014/0143996 | A1* | 5/2014 | Bhagavatula | G02B 3/0087 |
| | | | | 29/428 |
| 2014/0147078 | A1* | 5/2014 | Bhagavatula | G02B 6/32 |
| | | | | 385/33 |
| 2016/0246004 | A1* | 8/2016 | Kachru | G02B 6/26 |

* cited by examiner

PASSIVE FIBER OPTIC BUTT COUPLING USING A SEMICONDUCTOR ETCHED FEATURE

TECHNICAL FIELD

Embodiments presented in this disclosure generally relate to aligning a fiber array connector to a photonic chip.

BACKGROUND

Alignment of optical components to waveguides, such as optical fibers, with high coupling efficiency continues to be a challenge in the photonics industry. To align the optical components actively, dedicated equipment is required which uses a sub-micron resolution multi-stage axis system with integrated cameras to align the components. Moreover, active monitoring of coupled light (i.e., active alignment) is often required. Not only is this equipment expensive, active alignment slows down the fabrication process and limits throughput.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an optical system that includes an optical connector and a photonic chip. The optical connector includes a plurality of grooves formed on a common surface of a substrate and a plurality of fibers of optical cables disposed in the plurality of grooves. The photonic chip includes a plurality of waveguides and a bulk trench including a first bottom surface and a first sidewall extending from the first bottom surface where at least two of the plurality of fibers are disposed within the bulk trench and aligned to respective ones of the plurality of waveguides. The photonic chip also includes an alignment trench comprising a second bottom surface and a second sidewall extending from the second bottom surface, where only one of the plurality of fibers is disposed in the alignment trench, wherein the one of the plurality of fibers registers with the alignment trench thereby aligning the plurality of fibers to the plurality of waveguides.

Another embodiment of the present disclosure is a photonic chip that includes a plurality of waveguides and a bulk trench comprising a first bottom surface and a first sidewall extending from the first bottom surface, and a second sidewall extending from the first bottom surface, where a width of the bulk trench permits at least two of a plurality of fibers of optical cables to be disposed within the bulk trench and aligned to respective ones of a plurality of waveguides in the photonic chip. The photonic chip also includes an alignment trench comprising a second bottom surface, a third sidewall extending from the second bottom surface, and a fourth sidewall extending from the second bottom surface, where a width of the alignment trench permits the alignment trench to register with one of the plurality of fibers thereby aligning the plurality of fibers to the plurality of waveguides.

Another embodiment of the present disclosure is a method that includes providing an optical connector comprising a plurality of grooves formed on a common surface of a substrate and a plurality of fibers of optical cables disposed in the plurality of grooves and registering one of the plurality of fibers to an alignment trench in a photonic chip. Further, the photonic chip comprises a plurality of waveguides and a bulk trench, the bulk trench includes a first bottom surface and a first sidewall extending from the first bottom surface, and a second sidewall extending from the first bottom surface, wherein, after the registering, at least two of the plurality of fibers are disposed within the bulk trench and aligned to respective ones of the plurality of waveguides. Moreover, the alignment trench comprises a second bottom surface, a third sidewall extending from the second bottom surface, and a fourth sidewall extending from the second bottom surface, wherein, after the registering, only one of the plurality of fibers is disposed in the alignment trench thereby aligning the plurality of fibers to the plurality of waveguides.

Example Embodiments

Embodiments herein include an optical system that passively aligns an optical device containing an optical cable (e.g., a fiber array connector (FAC)) to a waveguide in a photonic chip. A substrate of the FAC is machined or etched to include multiple grooves along a common axis or plane to hold optical waveguides, or more specifically, the fibers in the optical cables to the FAC. To align the fibers to the photonic chip, one of the fibers is disposed in an alignment trench which has a width that is substantially the same as the diameter of the fiber. When the fiber registers with the alignment trench, the fiber is aligned with a waveguide disposed at the end of the trench. Because the pitch between the fibers can be precisely controlled, aligning one of the fibers using the alignment trench results in the other fibers in the FAC becoming passively aligned to respective waveguides in the photonic chip.

Figure 1:
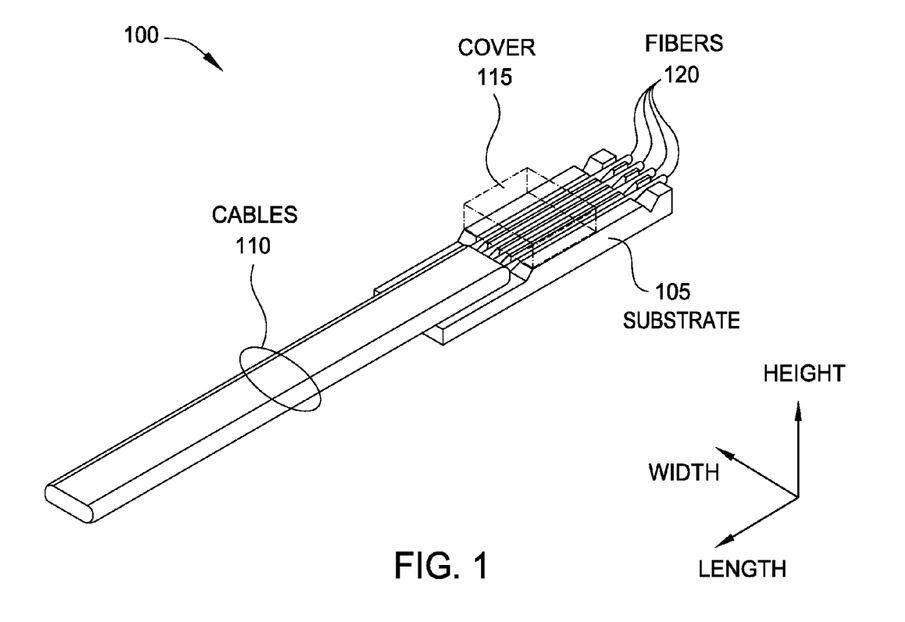
FIG. 1 is a fiber array connector, according to one embodiment described herein.

FIG. 1 is a FAC 100, according to one embodiment described herein. The FAC 100 includes a substrate 105 with a plurality of grooves (not shown) formed in a common (or same) surface along a common axis which holds a plurality of optical fibers 120. In one embodiment, the substrate 105 is made from semiconductor material (e.g., silicon) or from glass.

The fibers 120 (or optical outputs) are part of optical cables 110 which optical couple the FAC 100 to another optical component (e.g., a transmitter such as a laser which transmits an optical signal into the photonic chip or receiver which detects signals received from the photonic chip). The cables 110 may include a center core, cladding material, buffer coating, and an insulating jacket. In this example, the jackets and buffer coating are stripped off the cables 110 in the portion where the fibers 120 align to the grooves in the substrate 105. As used here, the fiber 120 may refer to the combination of both the center core and cladding. The diameter of the fiber 120 for a single mode fiber may range from 100 microns to 200 microns, for example.

The fibers 120 of the cables 110 are disposed between the substrate 105 and a cover 115 (or lid). When fabricating the FAC 100, the fibers 120 of the cables 110 are disposed in the grooves while the cover 115 is used to ensure the fibers 120 contact the sidewalls of the grooves. Put differently, a force may be applied on the cover 115 in a direction towards the substrate 105 so that the optical fibers 120 are properly seated and aligned in the grooves. An adhesive material— e.g., an epoxy—can then be used to backfill the spaces between the substrate 105, fibers 120, and the cover 115 such that relative positions between these components are fixed. In one embodiment, the cover 115 is formed from a glass, but could be made from any material that can provide structural support to hold the fibers 120 in the grooves on the substrate 105. Moreover, some FACs may not include the cover 115 but instead rely on an adhesive material to fix the fibers 120 in place in the grooves.

As shown, the cover 115 covers only a portion of the fibers 120. That is, the length of the cover 115 is less than a total length of the fibers 120 (i.e., the stripped portion of the cables 110). In this example, the cover 115 does not overlap the fibers 120 near the end of the FAC 100 (i.e., the end where the fibers 120 interact with a photonic chip). In some FACs, the lid extends to the end of the FAC to provide support at the location where the fibers 120 terminate at an external optical component (e.g., a photonic chip). However, as described below, a portion of the fibers 120 are left uncovered by the cover 115 so that the fibers 120 can be aligned using an alignment trench on the photonic chip.

Figure 2:
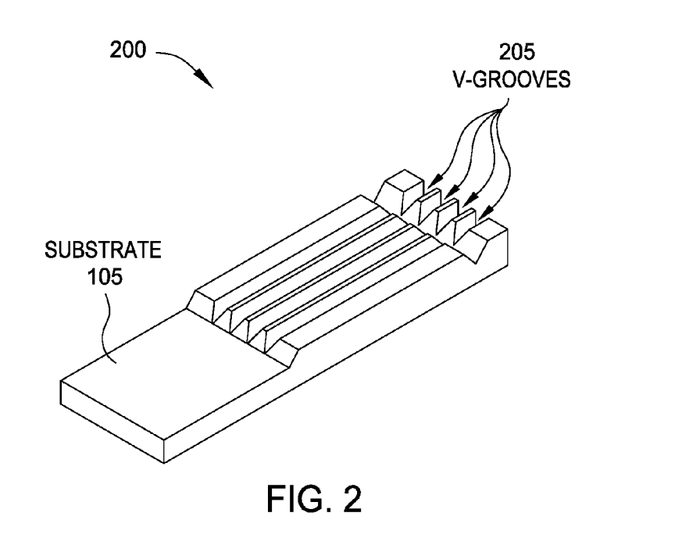
FIG. 2 is a substrate of a fiber array connector, according to one embodiment described herein.

FIG. 2 is a plan view 200 of the substrate 105 in the FAC 100, according to one embodiment described herein. For clarity, the fibers, cables, and cover have been removed from the FAC 100. As shown, the substrate 105 includes a plurality of V-grooves 205 that are arranged along a common plane or surface. Although V-grooves are specifically shown, in other embodiments, the grooves 205 can be U-shaped. When assembling the FAC 100, the cables are stripped to expose fibers that are at least as long the V-grooves 205. The fibers are placed in the V-grooves and the cover can be disposed over a portion of the fibers as shown in FIG. 1 to hold the fibers in the grooves 205.

If made from glass, the substrate 105 can be etched or machined to form the V-grooves 205. If the substrate 105 is made using silicon, the V-grooves 205 can be formed using, e.g., a potassium hydroxide (KOH) etch.

Figure 3:
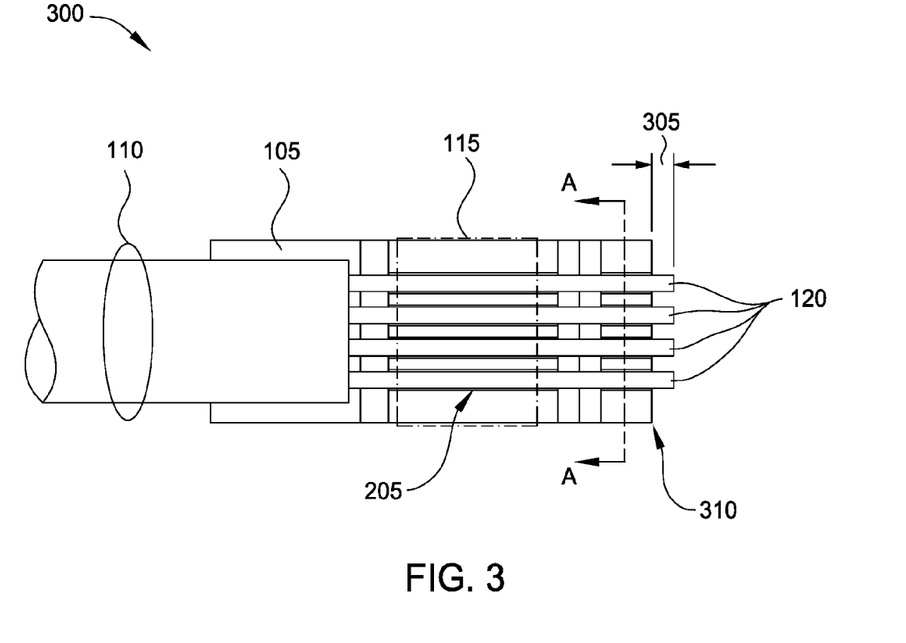
FIG. 3 is a top view of a fiber array connector, according to one embodiment described herein.

FIG. 3 is a top view 300 of the FAC 100, according to one embodiment described herein. For clarity, the cover 115 is shown in phantom (as shown by the dotted lines) to illustrate the fibers 120 extending through the V-grooves 205 on the substrate 105. As shown, the cover 115 does not overlap the entire length of the fibers 120. Thus, the upper surfaces of the fibers 120 extending from the edge of the cover 115 toward the end 310 are exposed while the lower surfaces of the fibers 120 face the V-grooves 205.

In this embodiment, the fibers 120 have an overhang 305 where the tips of the fibers 120 extend beyond the end 310 of the substrate 105. The overhang 305 is useful for cutting the fibers 120. In FACs where the cover 115 extends to the end 310 (unlike the FAC 100 shown here), the FAC can be polished at the end to generate a finished surface for interfacing with the photonic chip. However, in this embodiment, the cover 115 does not extend to the end 310, and thus, polishing the fibers 120 and the substrate 105 may break the fibers 120 or force the fibers 120 out of the V-grooves 205. Instead, the overhang 305 provides clearance for a laser to be used to cleave the fibers 120 so that the fibers 120 all have the same length. Stated differently, instead of polishing the FAC 100, the overhang 305 provides clearance so that a laser can cleave the fibers 120 before the fibers are disposed on a photonic chip. In one embodiment, the overhang 305 ranges from 100 to 300 microns.

Figure 4:
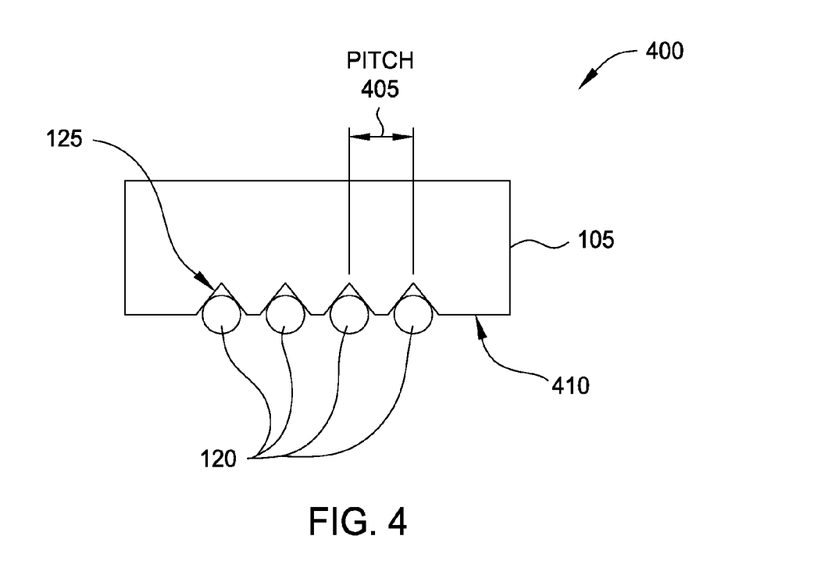
FIG. 4 is a cross sectional view of a fiber array connector, according to one embodiment described herein.

FIG. 4 is a cross sectional view 400 of the FAC 100, according to one embodiment described herein. Specifically, view 400 illustrates the cross-section in FIG. 3 labeled A-A. As shown, the fibers 120 are disposed in V-grooves 205 in the substrate 105 such that each fiber 120 contacts both sides of a respective V-groove 205. A portion of the fiber 120 extends below a bottom surface 410 of the substrate. In one embodiment, the angle and length of the sides in the V-grooves 205 are formed such that at least half of the fiber 120 is below the surface 410. As such, the width of the V-grooves 205 at the surface 410 may be equal to or less than the diameter of the optical fibers 120. However, in another embodiment, the width of the V-grooves 205 at the surface 410 may be greater than the diameter of the optical fibers 120 so that more than half of the fibers 120 are contained within the V-grooves 205.

FIG. 4 also illustrates the pitch 405 between the V-grooves 205. The pitch 405 also indicates the distance between the centers of the fibers 120. Some manufacturers of the FAC 100 can control the pitch 405 within a micron (e.g., a tolerance of +/−0.5 microns). As such, the spacing between the fibers 120 can be controlled with sub-micron precision. In one embodiment, the pitch 405 is between 200-300 microns but this can vary depending on the specific application.

Figure 5A:
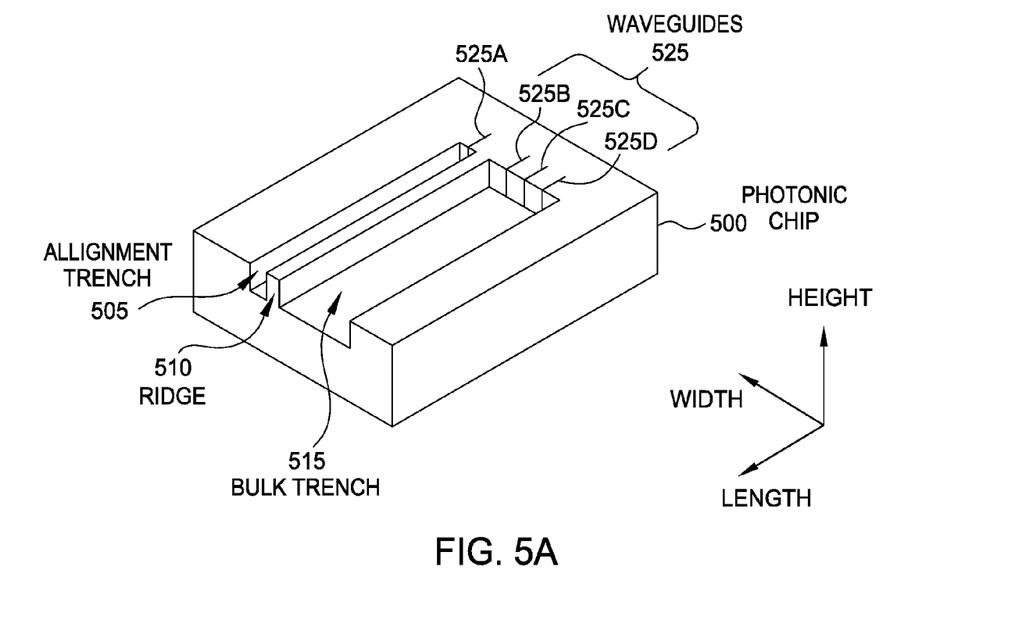
FIG. 5A is a photonic chip, according to one embodiment described herein.

FIG. 5A is a photonic chip 500, according to one embodiment described herein. The surfaces of the photonic chip 500 form an alignment trench 505 separated by a ridge 510 from a bulk trench 515. The alignment trench 505 and bulk trench 515 provide space so that the fibers of the FAC can be aligned with waveguides 525 disposed at the ends of the trenches 505 and 515. In another embodiment, the waveguides 525 near the trenches 505 and 525 include optical adapters which change the mode size of the optical signals. For example, the optical adapters in the waveguides 525 may increase coupling efficiency between the fibers and a portion of the waveguides 525 (e.g., silicon) which have height and width dimensions that are less than a micron by changing the mode size to better match the physical characteristics of the submicron portions of the waveguides 525.

The width of the alignment trench 505 is less than the width of the bulk trench 515. In one embodiment, the width of the alignment trench 505 is formed to permit only one of the fibers in the FAC to fit therein. In one example, the width of the alignment trench 505 is at least as wide of the diameter of the fiber such that the fiber can fit within the trench 505. For example, if the diameter of the fiber is 125 microns with a tolerance of +/−0.7 microns, then the worst case scenario is that the diameter of the fiber is 125.7 microns. In one embodiment, the width of the alignment trench 505 is designed so that an optical fiber at the highest range of the tolerance can still fit in the trench 505 (e.g., a width equal to or greater than 125.7 microns). Because the width of the alignment trench 505 is substantially the same (i.e., at or near the tolerance range) as the diameter of the fiber, the circumference of the fiber will register with the sidewalls of the trench 505 thereby aligning the fiber in the X direction (i.e., the width axis) with a waveguide 525A disposed at the end of the trench 505. However, "registering" the fiber with the alignment trench does not require that the width of the trench 505 must be the same or greater than the diameters of the fiber. Instead, the width of the trench 505 may be smaller than the fiber and by registering the fiber with the two sidewalls of the alignment trench 505 such that the fiber contacts the two sidewalls defining the width of the trench 505 all the fibers in the FAC can be aligned to the respective waveguides.

In contrast, the bulk trench 515 has a width that can accommodate multiple fibers rather than just one fiber as in the case of the alignment trench 505. Although the fibers may contact the sidewalls of the bulk trench 515 when the FAC is disposed on the photonic chip 500, this is not a requirement. In one embodiment, the fibers may be disposed in the bulk trench 515 without contacting either of the sidewalls. However, if the width of the alignment trench 505 is smaller than the diameter of the fibers, then one of the fibers in the bulk trench 515 may contact a sidewall of the trench 515 to separate the FAC from the top surface of photonic chip 500 the so that an undesired rotation of the FAC is not caused when one of the fibers registers with the alignment trench 505. Regardless, as described below, registering a fiber with the alignment trench 505 results in the fibers disposed in the bulk trench 515 being aligned in the X direction with the waveguides 525B, 525C, and 525D. In one embodiment, the spacing between the waveguides 525 is the same as the pitch between the fibers in the FAC.

In one embodiment, the alignment trench 505 and the bulk trench 515 are formed using deep reactive-ion etching (DRIE). This processing technique provides tight fabrication parameters so that the widths, heights, and lengths of the alignment trench 505 and bulk trench 515 can be controlled with less than 1-10 micron tolerances. As shown, both the alignment trench 505 and the bulk trench 515 have respective bottom surfaces which can be on the same plane or different planes. That is, DRIE may be used to ensure the alignment and bulk trenches 505, 515 have the same height or depth. Alternatively, the trenches 505, 515 may be formed during different etching steps in which case the bottom surfaces made be on different planes. In addition to the sidewalls establishing the width of the trenches 505, 515, the trenches 505, 515 include respective side surfaces on which the waveguides 525 are exposed and which are perpendicular to the bottom surfaces. In alignment trench 505, only one of the waveguides 525 (i.e., waveguide 525A) is exposed on its side surface while three waveguides 525 (i.e., waveguides 525B-D) are exposed on the side surface for the bulk trench 515.

Figure 5B:
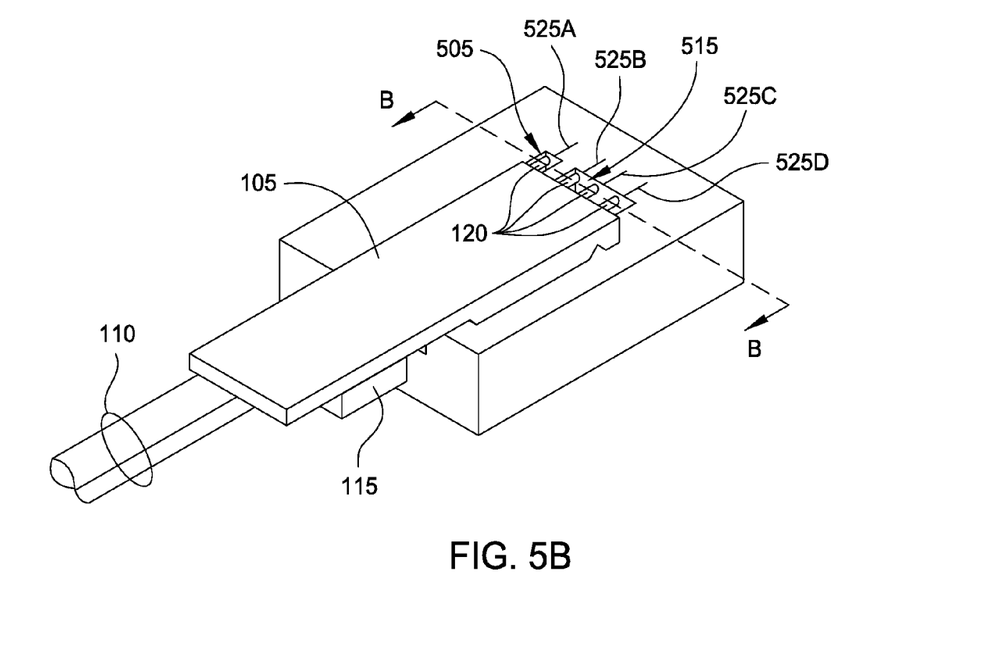
FIG. 5B is fiber array connector coupled to a photonic chip, according to one embodiment described herein.

FIG. 5B illustrates coupling the FAC 100 to the photonic chip 500, according to one embodiment described herein. As shown, the FAC 100 is brought into alignment with the photonic chip 500 such that each fiber 120 is aligned with a respective one of the waveguides 525. In one embodiment, the core in each fiber 120 is aligned with one of the waveguides 525 so that optical signals can be transmitted between the photonic chip 500 and the FAC 100. As shown, only one fiber 120 is disposed in the alignment trench 505, while three of the fibers 120 are disposed in the bulk trench 515.

To attach the FAC 100 to the photonic chip 500, the FAC 100 is flipped relative to the view 300 in FIG. 3 such that the fibers 120 are facing the alignment and bulk trenches 505 and 515. In this arrangement, the fiber 120 disposed in the alignment trench 505 acts as an alignment or registration fiber. This alignment fiber can be passively aligned to the alignment trench 515 such that the fiber registers with the alignment trench 505. This registration is shown in more detail in FIG. 6.

Although not shown, the waveguides 525 may be coupled to optical components in the photonic chip 500 such as optical modulators (e.g., Mach-Zehnder interferometers, ring resonators, Fabry-Perot cavities, etc.) and/or optical detectors (referred to general as optical components). The photonic chip 500 may also include electrical connections to an electrical integrated circuit (IC) which permit electrical data signals provided by the IC to control the optical components in the photonic chip 500. For example, using a continuous wave (CW) source, the photonic chip 500 may modulate a CW optical signal and use the waveguides 525 to transmit the modulated signal into the optical cables 110 of the FAC 100.

In one embodiment, the photonic chip 500 comprises a semiconductor substrate such as silicon or germanium. In one embodiment, the photonic chip 500 includes a buried oxide layer such as in a silicon-on-insulator structure.

Figure 6:
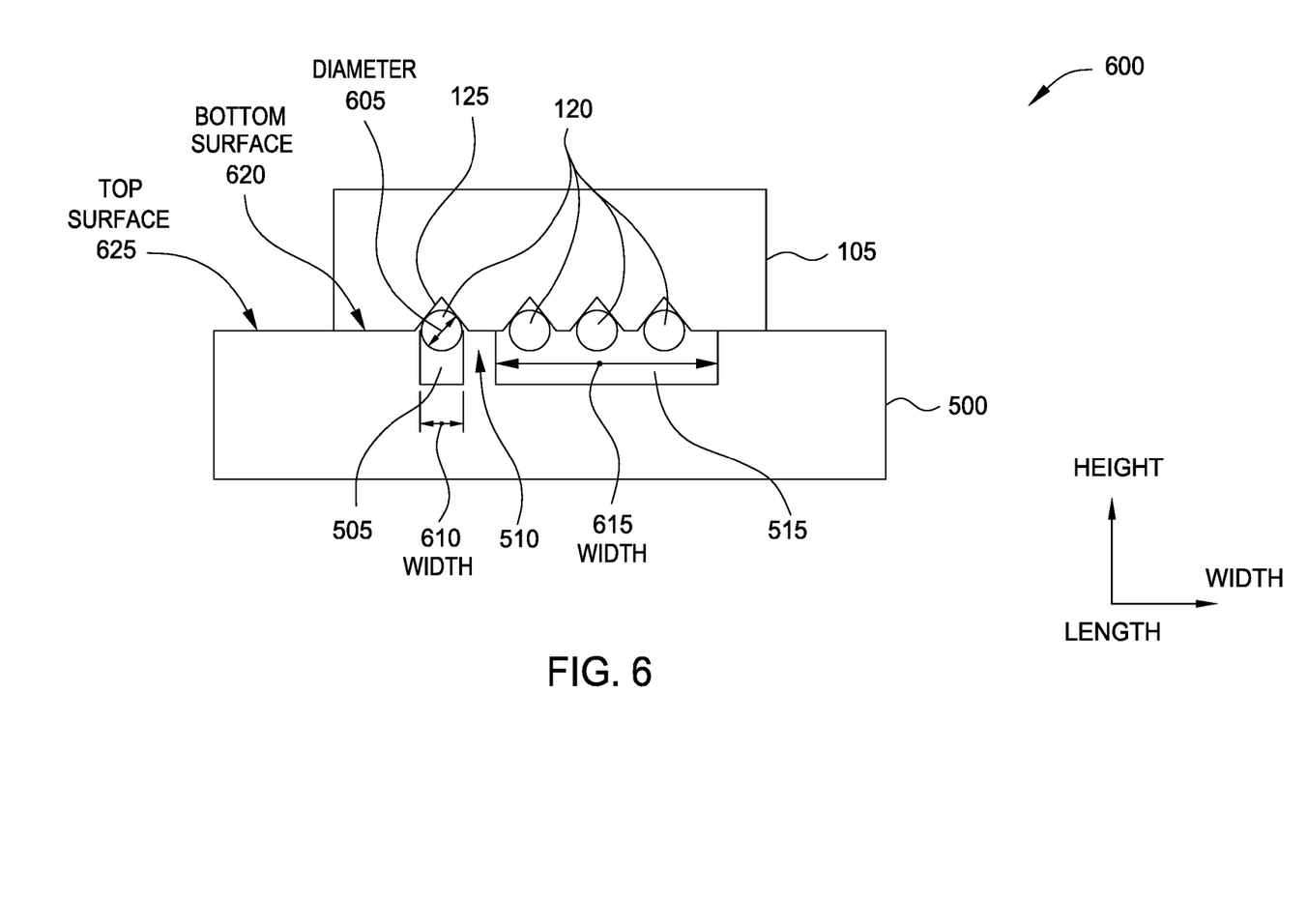
FIG. 6 is a cross section of a fiber array connector and a photonic chip, according to one embodiment described herein.

FIG. 6 is a cross section view 600 of the FAC 100 and the photonic chip 500, according to one embodiment described herein. Specifically, FIG. 6 illustrates the cross section labeled B-B in FIG. 5B. As shown, the leftmost fiber 120 (i.e., the alignment fiber) has a diameter 605 substantially the same as a width 610 of the alignment trench 505. In one embodiment, the width 610 of the trench 505 is equal to or greater than the diameter 605 of the fiber 120 such that when the fiber 120 is disposed in the trench 505 the fiber 120 fits snugly in the trench 505. In another embodiment, the width 610 of the alignment trench 505 is set to the maximum diameter 605 of the fiber 120 considering the fabrication tolerance of the fiber 120. As a result, regardless of the variation in the process using to form the fibers 120, the width 610 of the alignment trench is at least as wide as the diameter 605 of the fiber 120. Because in this example the leftmost fiber 120 always fits within the alignment trench 505, this means this fiber 120 does not prevent a bottom surface 620 of the substrate 105 from contacting a top surface 625 of the photonic chip 500. Put differently, by registering the leftmost fiber 120 with the alignment trench 505, the bottom surface 620 and top surface 625 lie on the same plane—i.e., there is no space between these surfaces.

Once the leftmost fiber 120 is registered with the alignment trench 505 (and the bottom surface 620 lies flat on the top surface 625) this also aligns the three remaining fibers 120 with their respective waveguides (not shown) in the bulk trench 515. That is, because the pitch between the fibers 120 and the V-grooves 205 in the substrate 105 and the pitch between the waveguides in the photonic chip 500 can be controlled with tight tolerances, passively aligning the leftmost fiber 120 with the alignment trench 505 passively aligns the other fibers 120 and waveguides in the X direction. In this manner, one alignment trench 505 can be used to passively align all the fibers in a FAC 100.

Moreover, by ensuring the bottom surface 620 lies flat on the top surface 625 of the substrate 105, this passively aligns the fiber cores with the waveguides in the Y direction (i.e., the height axis). Put differently, once a technician registers the leftmost fiber 120 with the alignment trench 505 and ensures the surface 620 lies flat on the surface 625, the cores of the fibers 120 are aligned in the Y direction with the waveguides in the photonic chip 500. Moreover, ensuring the bottom surface 620 lies flat on the top surface 625 mitigates any rotational error in the alignment.

Although FIG. 6 illustrates disposing half of the leftmost fiber 120 in the V-groove 205 and the remaining half in the alignment trench 505, this is not a requirement. In other embodiments, the V-groove 205 is designed such that more or less than half of the fiber 120 is contained within the V-groove 205 while the remaining portion fits within the trench 505. Regardless, the width 610 can be set so that registering the alignment trench 505 with the leftmost fiber 120 aligns all the fibers 120 in the FAC 100 to respective waveguides in the photonic chip 500.

Figure 7A:
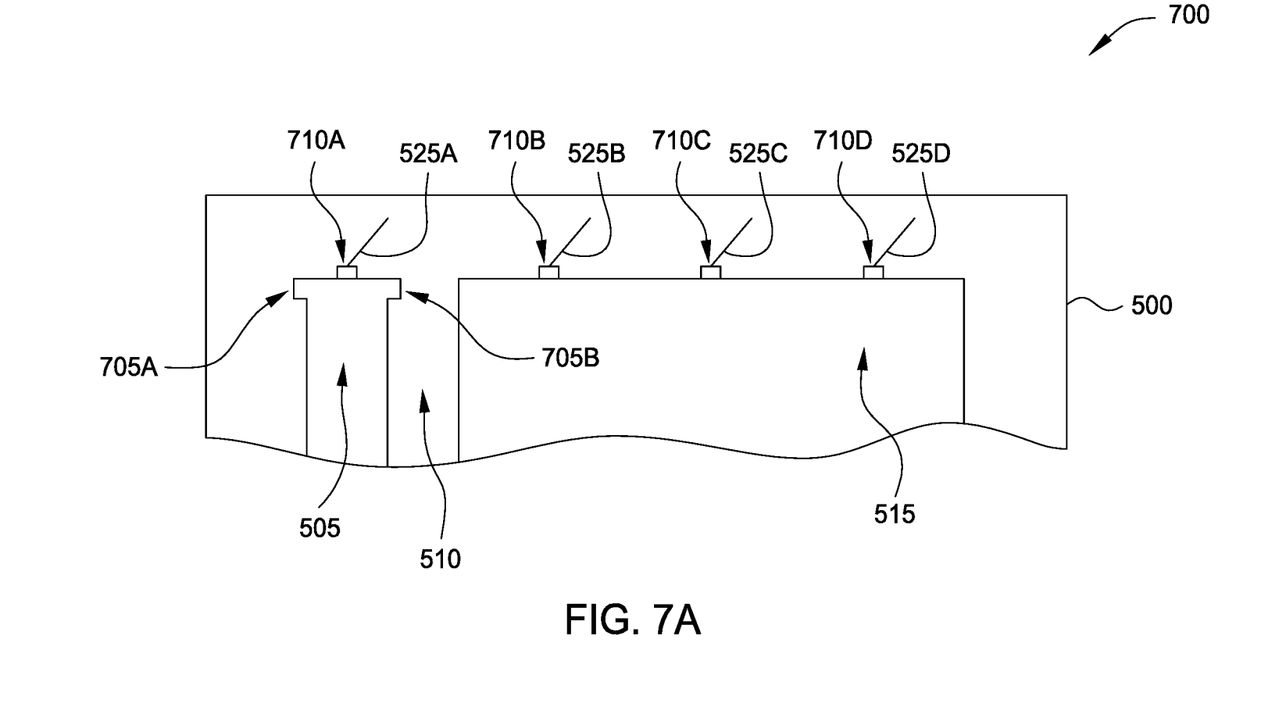
FIG. 7A is a top view of a photonic chip, according to one embodiment described herein.

FIG. 7A is a top view 700 of the photonic chip 500, according to one embodiment described herein. Specifically, FIG. 7A illustrates only a portion of the photonic chip 500 where the alignment trench 505 and the bulk trench 515 terminate at the waveguides 525A-D. For clarity, the fibers in the FAC are not shown.

In this embodiment, the alignment trench 505 includes etched features at the interface between the trench 505 and the waveguide 525A. These features include a flare clearance 705A and 705B and a receptacle 710A. The flare clearances 705 are etched into the sidewalls of the alignment trench 505 to provide extra space for accommodating the tip of a fiber in the FAC. When using laser cleaving to cut the tips of the fibers for the FAC, the laser can cause the tips to flare. Put differently, the diameter at the end of the fiber can be slightly greater (e.g., 1-5 microns) than the diameter elsewhere on the fiber. To accommodate this flare, when forming the alignment trench 505, the flare clearances 705 are etched into the sidewall thereby increasing the width of the trench 505 at the interface between the trench 505 and the waveguide 525A. In this manner, even if the tip of the fiber flares, the fiber can still register with the alignment trench 505. In one embodiment, the flare clearances 705 add an additional 1-50 microns of width to the alignment trench 505 at the interface with the waveguide 525A.

The alignment trench 505 also includes a receptacle 710A that forms a gap between the waveguide 525A and the fiber when disposed in the trench 505. In one embodiment, the receptacle 710A may have a width that is the same as, or greater than, the width of the core in the fiber. Moreover, the receptacle 710A may have a length that is 10-50 microns. After the fiber is disposed in the alignment trench 505, the receptacle 710A can be filled with an index matching material to reduce optical reflections between the waveguide 525A and the fiber. That is, because the refractive index of the fiber and the refractive index of the material of the waveguide 525A may differ, optical reflections may occur as optical signals are transferred between the photonic chip 500 and the FAC. Adding the index matching material (e.g., a liquid, adhesive, or gel) reduces the optical reflections between the fiber in the FAC and the waveguide 525A in the photonic chip.

Like the alignment trench 505, the bulk trench 515 includes corresponding receptacles 710B-D where the bulk trench 515 interfaces with the waveguides 525B-D. Once the fibers are disposed in the bulk trench 515, the receptacles 710B-D are filled with index matching material. In one embodiment, the index matching material is cured using, for example, a heating source or a UV light source.

Figure 7B:
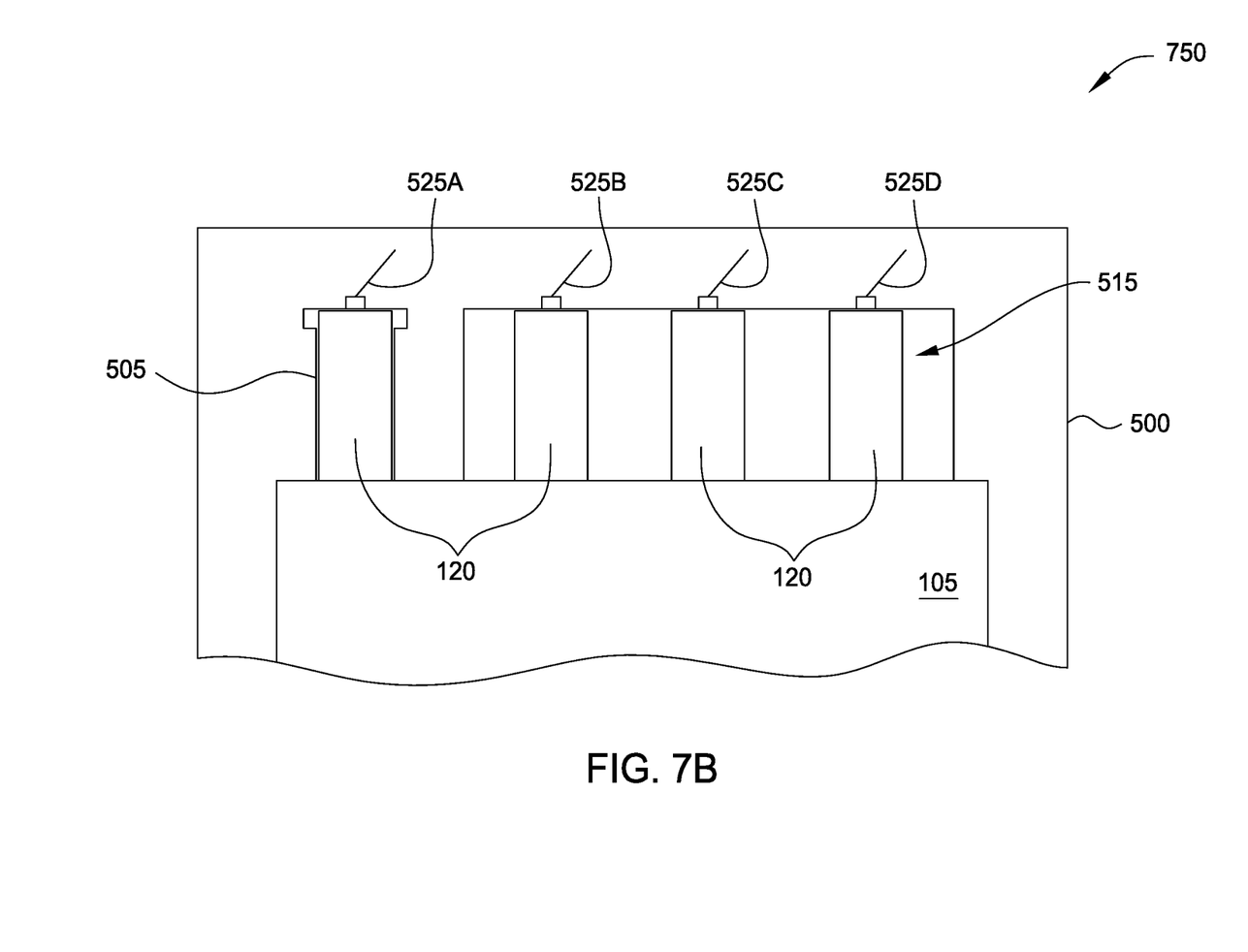
FIG. 7B is a top view of a fiber array connector bonded to a photonic chip, according to one embodiment described herein.

FIG. 7B is a top view 750 of the FAC 100 bonded to the photonic chip 500, according to one embodiment described herein. The view 750 is the same as the view 700 in FIG. 7A except that the fibers 120 in the FAC 100 have been placed in the respective trenches 505 and 515. Assuming the leftmost fiber 120 registers with the alignment trench 505 (and the bottom surface of the substrate 105 rests flush with the top surface of the chip 500), the fibers 120 are aligned with the respective waveguides 525 in the X and Y directions.

Any number of techniques can be used to align the fibers 120 to the waveguides 525 in the Z direction (i.e., the vertical direction shown in FIG. 7B). In one embodiment, active alignment can be used where light is transmitted (or received) using the fibers 120 and then measured. A technician can slide the FAC 100 relative to the photonic chip 500 in the Z direction until the measured light reaches a desired threshold.

In another embodiment, passive alignment is used to align the fibers 120 and the waveguides 525 in the Z direction. In one example, one or more cameras can be used in a vision based alignment system to align the FAC 100 without having to actively transmit light through the fibers 120. In yet another example, a technician may slide the fibers 120 until they contact surfaces of the trenches 505 and 515 where the waveguides 525 begin. In this example, the surfaces of the trenches 505 and 515 which include the waveguides 525 are alignment features which enable passive alignment. Regardless whether active or passive alignment is used, the fibers 120 are butt coupled to the waveguides 525. As used herein, butt coupling the fibers 120 and waveguides 525 means these components are optically connected without using any type of intermediary lens or other focusing element. After being aligned, the fibers 120 may directly contact the surfaces of the trenches 505 and 515 which have the waveguides 525, or alternatively, the fibers 120 may be spaced 1-10 microns away from these surfaces.

Moreover, the leftmost fiber 120 can register with the alignment trench even if the width of the trench 505 is greater than the diameter of the fiber 120. For example, when the leftmost fiber 120 is disposed in the trench 505, the fiber 120 may only contact one half of the trench. However, in other locations, the leftmost fiber 120 may contact both sides of the trench 505 as the diameter of the fiber 120 (and the width of the trench 505) varies due to variance in the manufacturing process. Nonetheless, as described above, the width of the alignment trench 505 can be controlled such that when the leftmost fiber 120 registers with the trench 505 passive alignment is achieved between the fibers 120 and the waveguides 525 in at least one alignment direction.

Although FIGS. 5A-B, 6, and 7A-B illustrate a photonic chip 500 with only one alignment trench, in other embodiments the photonic chip includes multiple alignment trenches. For example, in addition to having alignment trench 505, a photonic chip may include a second alignment trench (with width dimensions that permit only one fiber to register with the trench) on the other side of the bulk alignment trench 515. That is, the leftmost fiber in the FAC 100 registers with the first alignment trench 505, the two middle fibers are disposed in the bulk trench 515, and the rightmost fiber registers with the second alignment trench which is separated from the bulk trench 515 by another ridge. Having multiple alignment trenches may be preferred with FACs that have more than four fibers—e.g., FACs with twelve fibers—where the rightmost fiber is disposed in a first alignment trench, the leftmost fiber is disposed in a second alignment trench and the remaining middle fibers are disposed in a bulk trench.

Figure 8A:
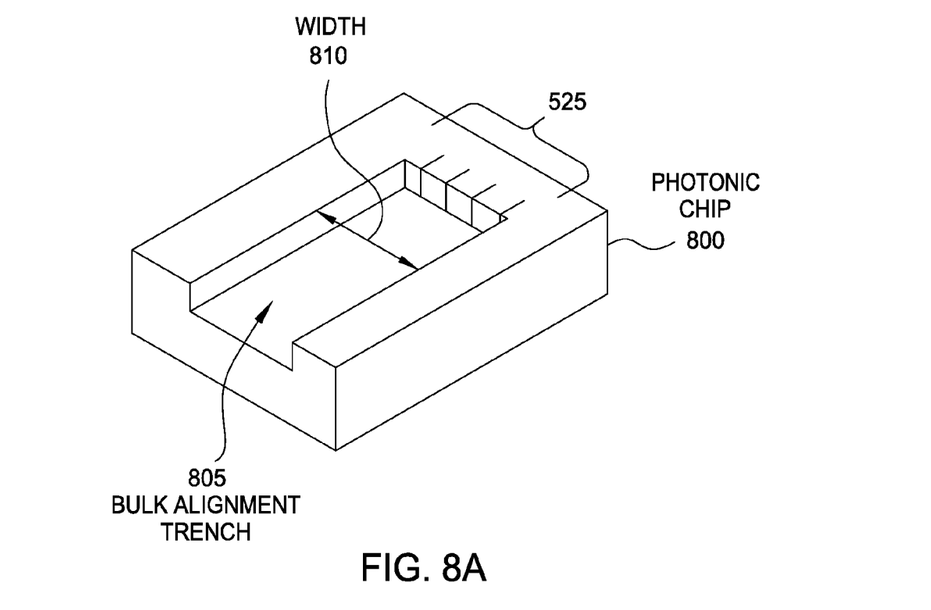
FIG. 8A is a photonic chip, according to one embodiment described herein.

FIG. 8A is a photonic chip 800, according to one embodiment described herein. The photonic chip 800 differs from the photonic chip 500 illustrated above in that photonic chip 800 does not include the ridge 510 which separates the alignment trench 505 from the bulk trench 515. Instead, photonic chip 800 includes a bulk alignment trench 805 with a width 810 sufficient to hold all the fibers 120 in the FAC 100. That is, instead of the fibers 120 of the FAC being disposed in at least two different trenches, here the fibers 120 are disposed in the same trench 805. The remaining portions of the photonic chip 800 may be the same as the photonic chip 500.

The width 810 of the bulk alignment trench 805 permits the fibers of the FAC (not shown) to register with the sidewalls of the trench 805 to passively align the fibers to the waveguides 525. That is, like with the structures shown above, the photonic chip 800 can achieve passive alignment of the fibers to the waveguides 525 in at least one optical alignment direction.

Figure 8B:
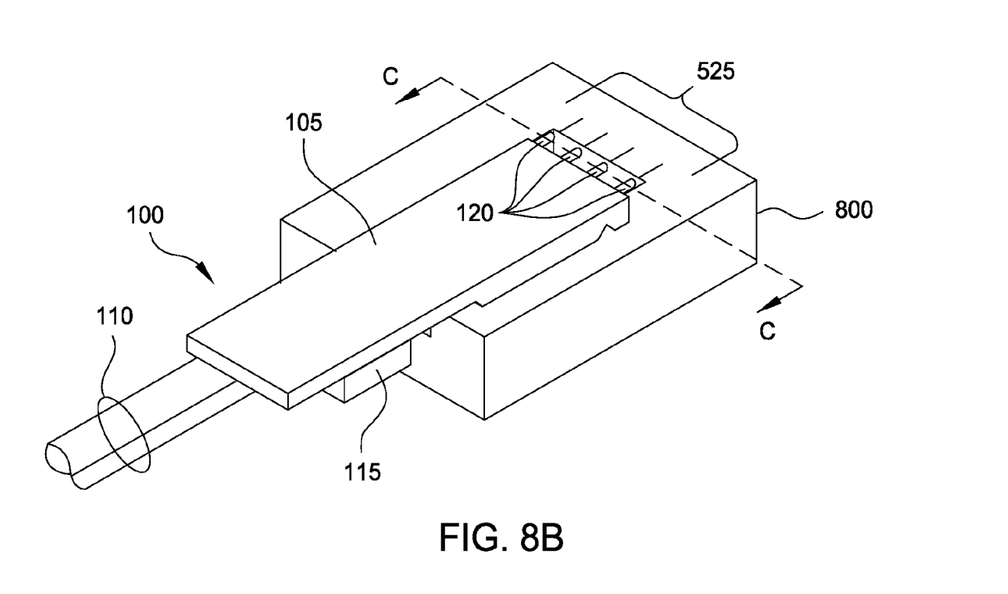
FIG. 8B is a fiber array connector coupled to a photonic chip, according to one embodiment described herein.

FIG. 8B illustrates the FAC 100 coupled to the photonic chip 800, according to one embodiment described herein. As shown, the fibers 120 in the FAC 100 are registered with the sidewalls of the bulk alignment trench 805. Moreover, the side surface of the trench 805 on which the waveguides 525 are exposed may also be used as an alignment feature to passively align the fibers 120 in the Z-direction (i.e., the length direction). Further, the bottom surface of the substrate 105 can lie flat on the top surface of the photonic chip 800 to passively align the fibers 120 and the waveguides 525 in the Y direction (i.e., the height direction). In one embodiment, the bulk alignment trench 805 is formed using a DRIE etch.

Figure 9:
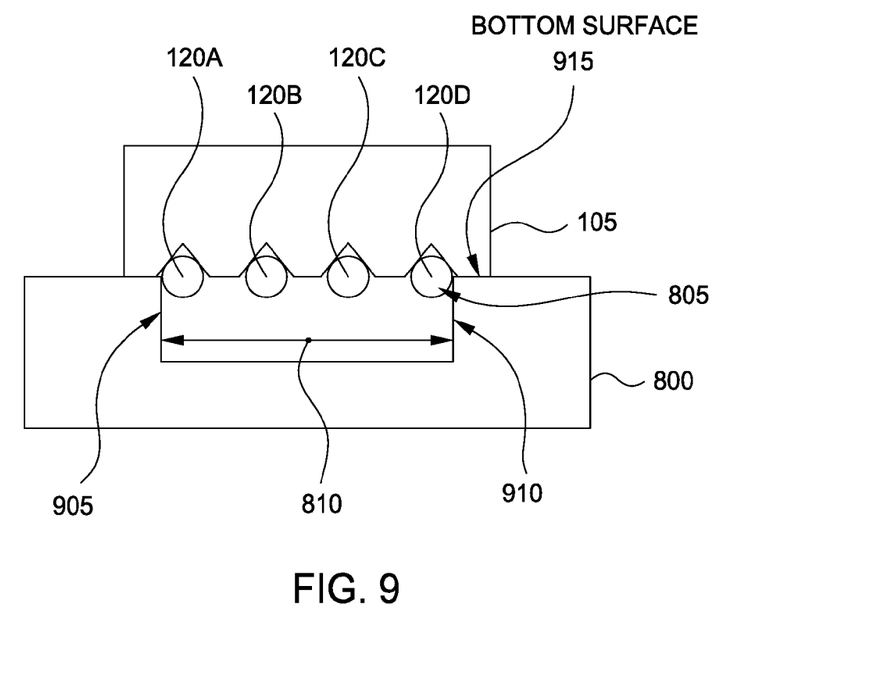
FIG. 9 is a cross section of a fiber array connector and a photonic chip, according to one embodiment described herein.

FIG. 9 is a cross section of the FAC 100 and the photonic chip 800 along C-C as shown in FIG. 8B. Here, the width 810 of the bulk alignment trench 805 is selected so that a first sidewall 905 of the trench 805 contacts the leftmost fiber 120A and a second sidewall 910 of the trench 805 contacts the rightmost fiber 120D. Put differently, the width 810 is equal to, or slightly greater than (within a maximum tolerance) the combined pitch of the fibers 120. As such, the portions of the fibers 120 extending below a bottom surface 915 of the substrate 105 are disposed within the bulk alignment trench 805. A technician can register the fibers 120 to the photonic chip 800 by sliding the substrate 105 until the fibers 120 move into the bulk alignment trench 805, thereby passively aligning the fibers 120 to the waveguides exposed on a side surface of the trench 805.

Figure 10:
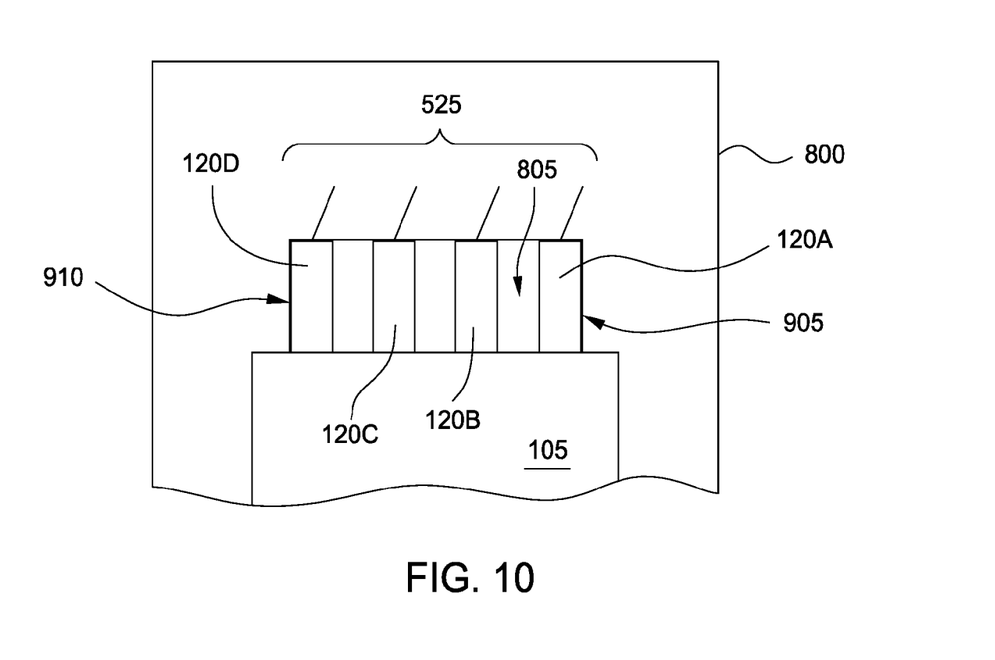
FIG. 10 is a top view of a fiber array connector bonded to a photonic chip, according to one embodiment described herein.

FIG. 10 is a top view of the FAC bonded to the photonic chip 800, according to one embodiment described herein. As shown, the fibers 120 align with respective ones of the waveguides 525. Assuming that fiber 120D registers with the sidewall 910 and that fiber 120A registers with the sidewall 905 (and the bottom surface of the substrate 105 rests flush with the top surface of the chip 800), the fibers 120 are aligned with the respective waveguides 525 in the X and Y directions.

In this disclosure, reference is made to embodiments presented in this disclosure. However, the scope of the present disclosure is not limited to specific described embodiments. Instead, any combination of the disclosed features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages are merely illustrative and are not considered elements or limitations of the appended claims except where explicitly recited in a claim(s).

In view of the foregoing, the scope of the present disclosure is determined by the claims that follow.

We claim:
1. An optical system comprising:
    an optical connector, comprising:
        a plurality of grooves formed on a common surface of a substrate,
        a plurality of fibers of optical cables disposed in the plurality of grooves; and
    a photonic chip, comprising:
        a plurality of waveguides,
        a bulk trench comprising a first bottom surface and a first sidewall extending from the first bottom surface, wherein at least two of the plurality of fibers are disposed within the bulk trench and aligned to respective ones of the plurality of waveguides,
        an alignment trench comprising a second bottom surface and a second sidewall extending from the second bottom surface, wherein only one of the plurality of fibers is disposed in the alignment trench, wherein the one of the plurality of fibers registers with the alignment trench thereby aligning the plurality of fibers to the plurality of waveguides; and
        a ridge separating the alignment trench and the bulk trench, wherein a first side of the ridge connects to the first bottom surface and a second side of the ridge connects to the second bottom surface.

2. The optical system of claim 1, wherein a width of the alignment trench is substantially the same as a diameter of the one of the plurality of fibers that registers with the alignment trench.

3. The optical system of claim 1, wherein the first and second bottom surfaces are arranged on a common plane.

4. An optical system comprising:
    an optical connector, comprising:
        a plurality of grooves formed on a common surface of a substrate,
        a plurality of fibers of optical cables disposed in the plurality of grooves; and
    a photonic chip, comprising:
        a plurality of waveguides,
        a bulk trench comprising a first bottom surface and a first sidewall extending from the first bottom surface, wherein at least two of the plurality of fibers are disposed within the bulk trench and aligned to respective ones of the plurality of waveguides, and an alignment trench comprising a second bottom surface and a second sidewall extending from the second bottom surface, wherein only one of the plurality of fibers is disposed in the alignment trench, wherein the one of the plurality of fibers registers with the alignment trench thereby aligning the plurality of fibers to the plurality of waveguides, wherein a portion of the common surface of the substrate in the optical connector directly contacts a portion of a top surface of the photonic chip, wherein a distance between the top surface and the first bottom surface defines a depth of the bulk trench.

5. The optical system of claim 1, wherein the optical connector is a fiber array connector.

6. An optical system comprising:

an optical connector, comprising:

a plurality of grooves formed on a common surface of a substrate, a plurality of fibers of optical cables disposed in the plurality of grooves; and a photonic chip, comprising:

a plurality of waveguides, a bulk trench comprising a first bottom surface and a first sidewall extending from the first bottom surface, wherein at least two of the plurality of fibers are disposed within the bulk trench and aligned to respective ones of the plurality of waveguides, an alignment trench comprising a second bottom surface and a second sidewall extending from the second bottom surface, wherein only one of the plurality of fibers is disposed in the alignment trench, wherein the one of the plurality of fibers registers with the alignment trench thereby aligning the plurality of fibers to the plurality of waveguides, and an optical component optically coupled to at least one of the plurality of waveguides, wherein the at least one of the plurality of waveguides has a width and height that is less than a micron.

7. The optical system of claim 6, wherein the photonic chip comprises a silicon on insulator structure.

* * * * *